United States Patent [19]
Griffis

[11] Patent Number: 4,865,634
[45] Date of Patent: Sep. 12, 1989

[54] MULTIPLE LOCATION NEGATIVE AIR PRESSURE MONITOR

[76] Inventor: Steven C. Griffis, 2929 Avenue D, Council Bluffs, Iowa 51501

[21] Appl. No.: 312,819

[22] Filed: Feb. 21, 1989

[51] Int. Cl.⁴ ............................................. B01D 46/00
[52] U.S. Cl. ........................................ 55/213; 55/270; 55/274; 73/714; 73/756
[58] Field of Search ................... 55/21, 213, 270, 274; 73/714, 716, 717, 756; 340/626

[56] References Cited

U.S. PATENT DOCUMENTS

| | | | |
|---|---|---|---|
| 4,157,659 | 6/1979 | Murdock | 73/714 X |
| 4,733,431 | 3/1988 | Martin | 55/274 X |
| 4,784,675 | 11/1988 | Leber et al. | 55/213 |

*Primary Examiner*—Charles Hart
*Attorney, Agent, or Firm*—Zarley, McKee, Thomte, Voorhees & Sease

[57] ABSTRACT

A multiple location negative air pressure monitor is provided which enables the air pressure within a work space to be monitored at various locations throughout the work space so that the site operator is assured that the proper negative air pressure is maintained throughout the work area.

4 Claims, 3 Drawing Sheets

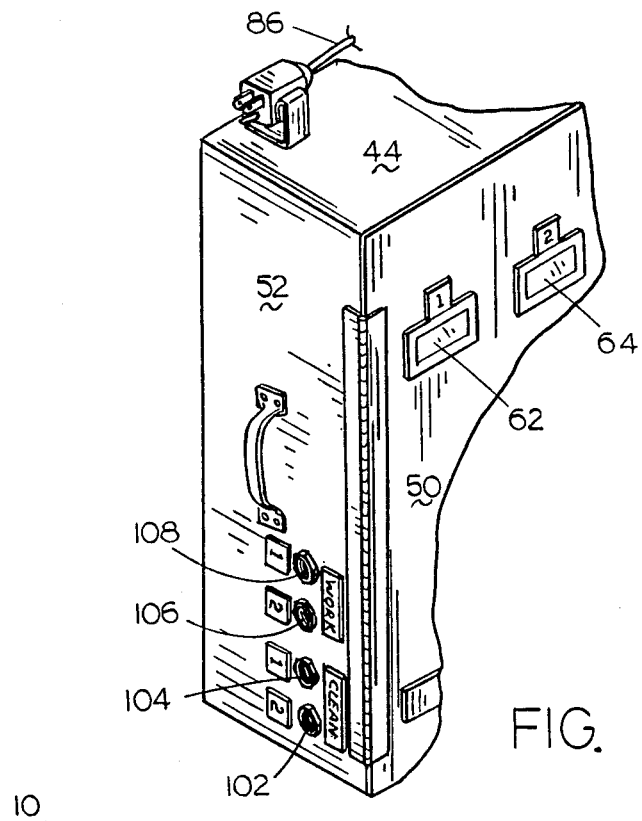
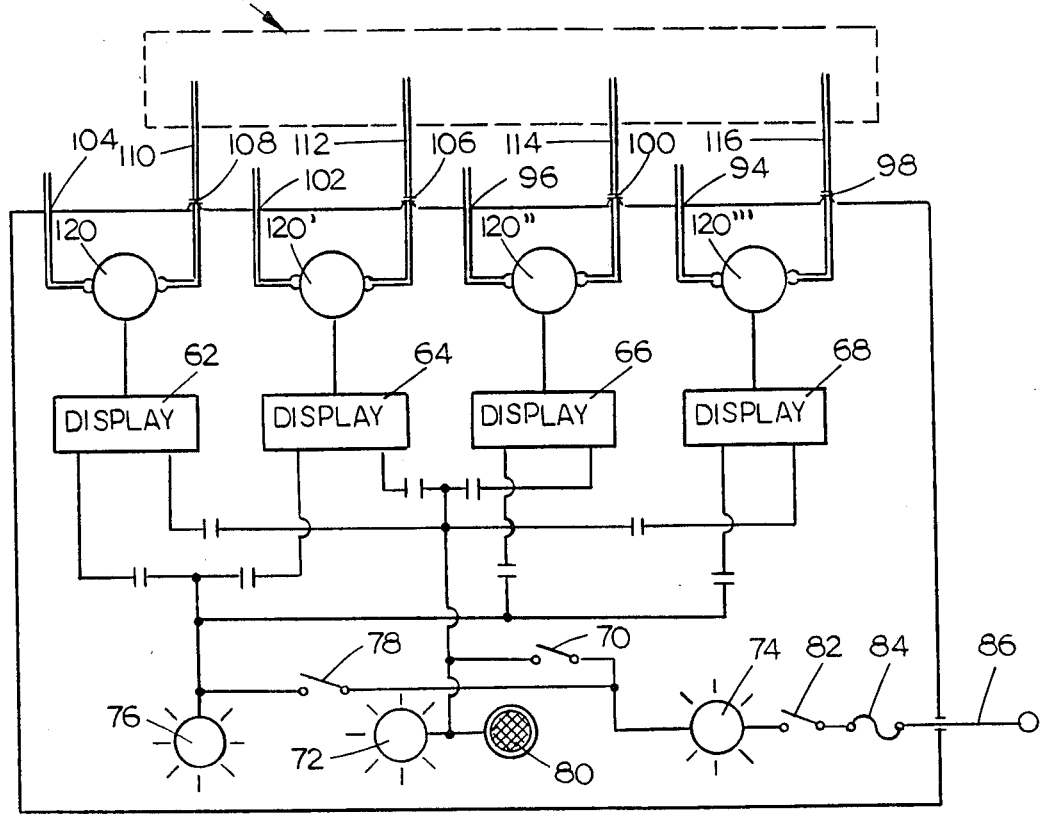
FIG. 4
FIG. 5

MULTIPLE LOCATION NEGATIVE AIR PRESSURE MONITOR

BACKGROUND OF THE INVENTION

Airborne asbestos contamination in buildings is a significant environmental problem. Various diseases have been linked with industrial exposure to airborne asbestos, and the extensive use of asbestos products in buildings has raised concerns about exposure to asbestos in nonindustrial settings. Surveys conducted by the Environmental Protection Agency (EPA) estimate that asbestos-containing materials can be found in approximately 321,000 schools and 733,000 other public and commercial buildings in this country.

In an effort to avoid the hazards associated with exposure to airborne asbestos, abatement actions or procedures are being extensively conducted and the Environmental Protection Agency has published a booklet entitled "Guidance for Controlling Asbestos-Containing Materials in Buildings." During the abatement action, one or more air filtration units, usually several air filtration units, are positioned throughout the work site to filter the air in the work place and to maintain a negative pressure within the space within which the abatement procedure is being conducted. It is important to maintain the negative pressure within the work area so that airborne asbestos fibers will not escape therefrom. In other words, by maintaining a negative pressure within the work space, air will tend to be drawn into the work area rather than being expelled or discharged therefrom.

It is therefore important to be able to monitor the negative air pressure within the work area to ensure that airborne fibers cannot escape therefrom. In applicant's co-pending application entitled "Remote Control and Monitor Means", Ser. No. 191,567 filed Apr. 9, 1988, a means was provided to sense the negative air pressure within the contaminated work space immediately adjacent the clean room area. However, it has been found that even though the desired negative pressure may be present at a particular location within the work space, the desired negative pressure may not exist at other locations within the work space. Further, it has been found desirable to be able to have a record of the negative air pressure within the work space for the period of time that the abatement procedure is being conducted.

SUMMARY OF THE INVENTION

In the instant invention, a multiple location negative air pressure monitor is provided which has the ability of monitoring the negative air pressure within the space where the asbestos abatement procedure is being conducted. The monitor is located remotely of the contaminated work space area and will normally be positioned in the clean room located adjacent to the work space. A plurality of tubes are connected to the monitor and extend to various spaced-apart locations within the work space. A plurality of tube also extend from the monitor so as to be in communication with the atmosphere outside the work space. A monitor includes a pressure differential sensing device and transmitter for each set of tubes so that the relative pressure differential at various locations within the work space may be monitored. The monitor includes audio and visual alarms as well as a digital visual display for each of the locations when the negative pressure is being monitored. The monitor is designed to be operatively connected to a conventional recorder for recording the pressures at the various locations within the contaminated work space area.

It is therefore a principal object of the invention to provide a multiple location negative air pressure monitor.

A further object of the invention is to provide a device of the type described which permits the monitoring of the negative air pressure at various locations within a contaminated work space area.

A further object of the invention is to provide an apparatus of the type described which includes digital visual displays which indicate the air pressure at locations throughout the work space area.

A still further object of the invention is to provide a device of the type described which includes audio and visual alarms for indicating the absence or lack of the desired negative pressure at a particular location within the work space area.

Still another object of the invention is to provide an apparatus of the type described which is economical of manufacture and durable in use.

These and other objects will be apparent to those skilled in the art.

BRIEF DESCRIPTION OF THE DRAWINGS

FIG. 4 is a partial perspective view of the left side of the monitor of FIG. 3; and FIG. 5 is a schematic illustrating the circuitry of the monitor.

DESCRIPTION OF THE PREFERRED EMBODIMENT

Figure 1:
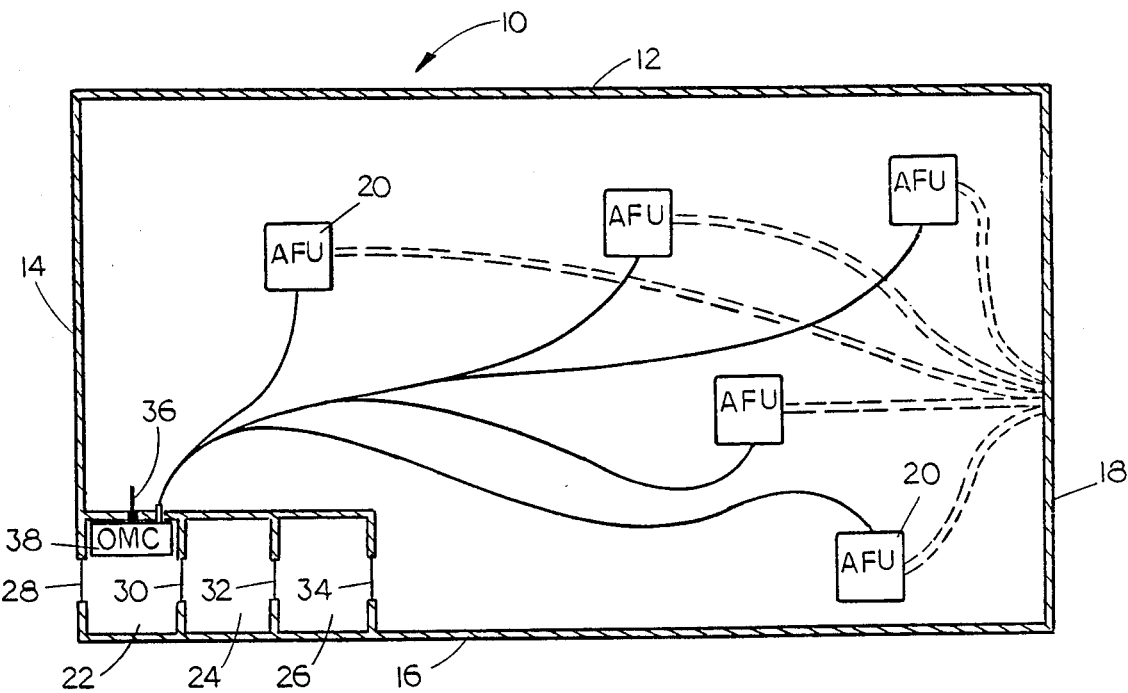
FIG. 1 is a schematic view of a conventional work site wherein an asbestos abatement action is being accomplished and wherein the negative air pressure within the work site is being monitored by a single monitor.

In FIG. 1, the numeral 10 refers to an enclosed space or work area wherein an asbestos abatement activity is taking place. Enclosed space is defined by walls 12, 14, 16 and 18. A plurality of air filtration units 20 are mounted within the space 10 and have their exhausts operatively communicating with the atmosphere outside of the work area 10. The operation of the air filtration units 20 creates a negative air pressure within the area 10.

A conventional clean room 22, shower room 24 and equipment room 26 are provided as seen in FIG. 1. The doors 28, 30, 32 and 34 normally consist of flexible plastic sheets which permit air to flow from outside the work area 10 into the work area 10 through the doors 28, 30, 32 and 34 but which will prevent the reverse flow of air therethrough. The air passes inwardly into the work area 10 through the doors just described due to the fact that the air filtration units 20 are creating the negative pressure within the work area 10. In FIG. 1, a tube 36 such as described in the co-pending application passes into the work area 10 from the clean room 22 so that the OMC 38 may monitor the negative air pressure at the inlet end of the tube 36. However, even though negative air pressure may exist at the inlet end of the tube 36 illustrated in FIG. 1, the desired negative air pressure may not exist at other locations within the work area 10. It is for that reason that the multiple location negative air monitor 40 of this invention has been devised.

Monitor 40 includes a housing or cabinet 42 having a top wall 44, bottom wall 46, back wall 48, front wall 50 which serves as the console panel, and opposite sides 52 and 54.

Figure 2:
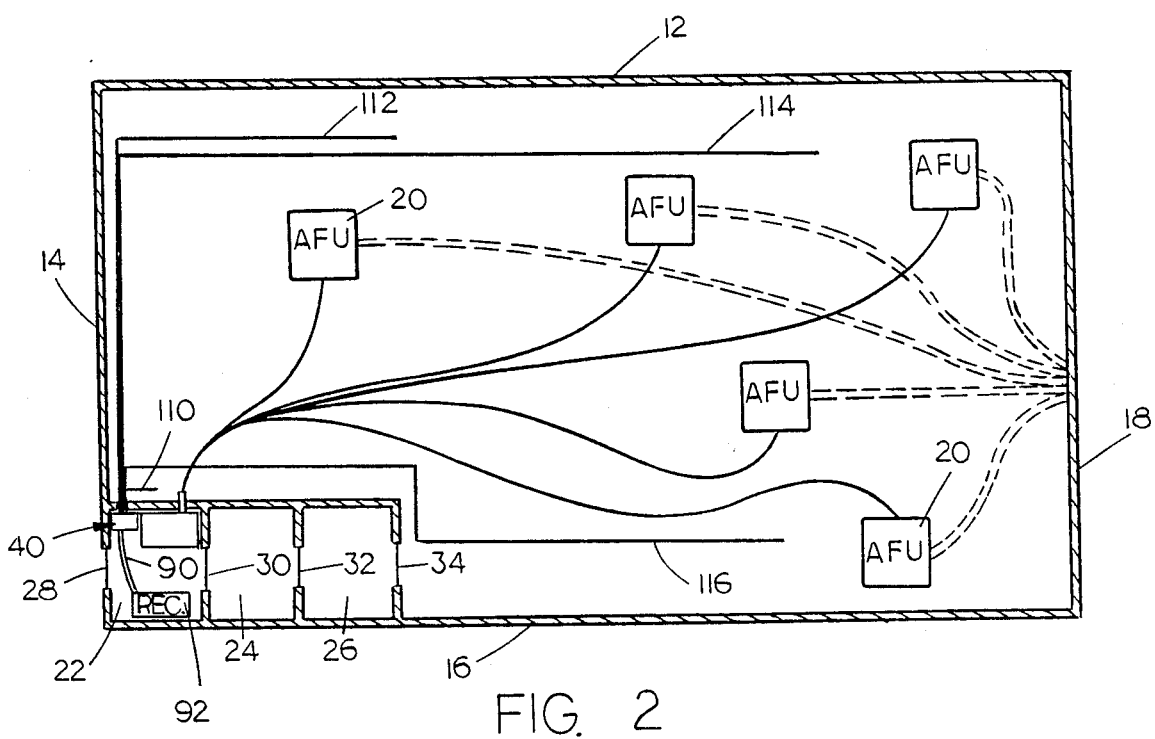
FIG. 2 is a schematic view of the work site of FIG. 1 wherein the negative air pressure is being monitored therein at various locations through the use of the instant invention.
Figure 3:
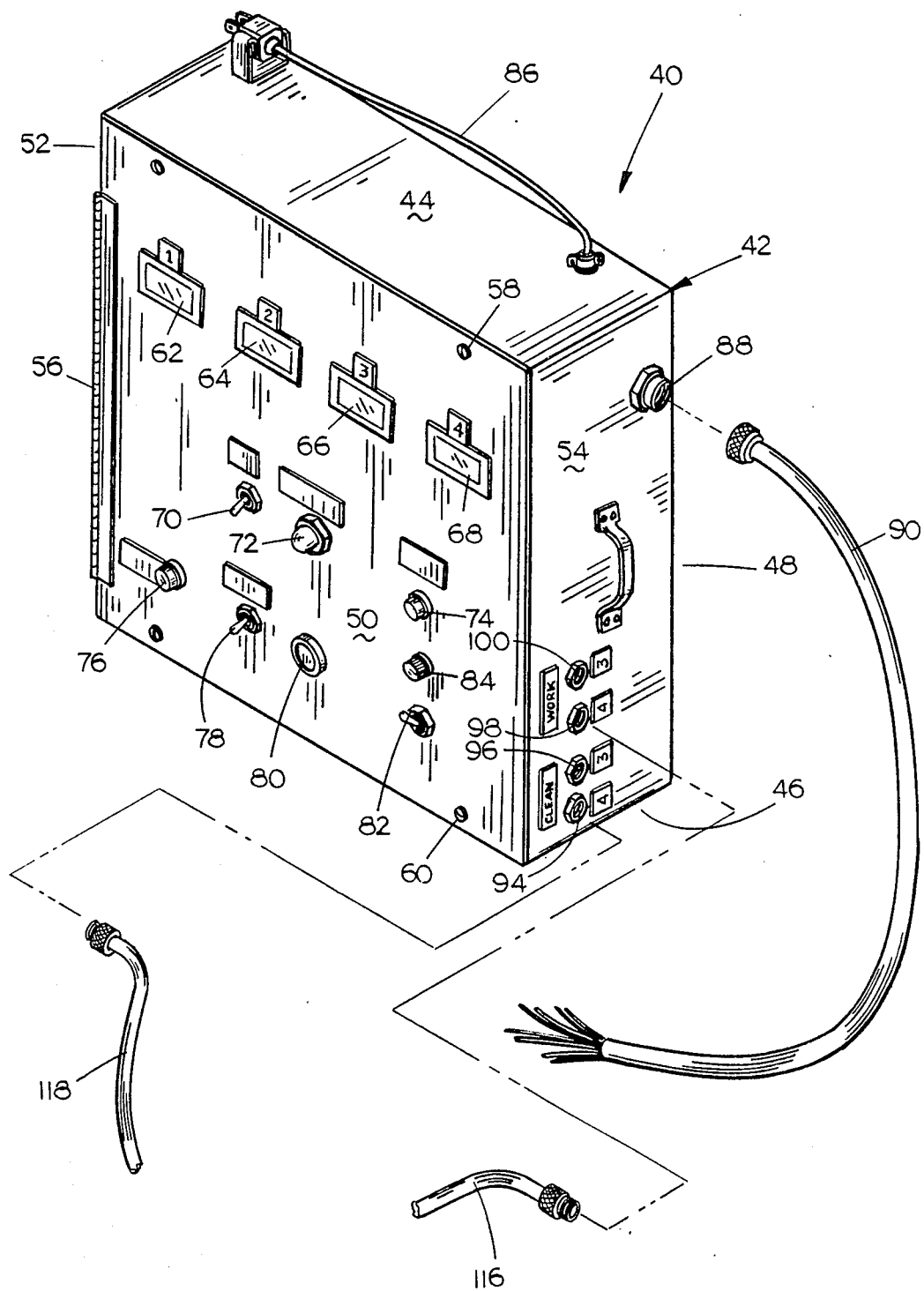
FIG. 3 is a perspective view of the monitor of this invention.

As seen in FIG. 3, front panel 50 is hinged at 56 to permit access to the interior of the cabinet 42. Panel 50 is maintained in its closed position by screws 58 and 60. Panel 50 is provided with digital readout displays 62, 64, 66 and 68 as seen in FIG. 3. Further, panel 50 is provided with alarm test switch 70, visual alarm 72, power on/off indicator 74, audible alarm on/off indicator 76, audible alarm on/off switch 78, audible alarm 80, power switch 82 and fuse 84. Monitor 40 is also provided with a power cord 86 extending therefrom and a jack 88 adapted to have cord 90 secured thereto which extends to a conventional recorder 92 which may be located within the clean room 22 or at some other remote location. Side 54 is provided with receptacles 94, 96, 98 and 100 while side 52 is provided with receptacles 102, 104, 106 and 108. Each of the receptacles 94-108 are adapted to receive the threaded end of tubes therein. In particular tubes 110, 112, 114 and 116 are secured to the receptacles 108, 106, 100 and 98 respectively and extend into the work space 10 as illustrated in FIGS. 2 and 5 so that the distal ends thereof are positioned at various locations within the work space 10. A tube is also secured to each of the receptacles 94, 96, 102 and 104 and would normally have their distal ends positioned in the clean room 22 or at some other location so as to be subjected to the atmospheric pressure outside of the work area. For purposes of illustration, FIG. 3 illustrates a tube 118 which is adapted to be connected to the receptacle 94.

As seen in FIG. 5, a conventional pressure differential sensor and transmitter device 120 is in communication with the tubes 104 and 110 so as to sense the pressure differential between the distal end of tube 110 and the distal end of tube 104. Similarly, devices 120', 120", and 120''' are provided. Devices 120, 120', 120", and 120''' are operatively electrically connected to the displays 62, 64, 66 and 68 so that the pressure differential sensed by the sensing devices will be displayed at panel 50.

As seen in FIG. 5, circuitry is provided in association with the displays 62, 64, 66 and 68 designed to actuate the visual alarm 72 and the audible alarm 80 when the predetermined value is sensed by any of the sensing devices 120, 120', 120", and 120'''. The test switch 70 enables the operator to determine whether the indicator 72 and alarm 80 are working at any particular time. Switch 78 permits the selective silencing of the alarm 80 at any desired time.

Thus it can be seen that a multiple location negative air pressure monitor has been provided which permits the monitoring of the negative air conditions throughout the work space 10. Although the monitor is described as being able to monitor the air pressure at four locations within the work space 10, it should be understood that any number of locations may be monitored by simply adding sensing devices, tubes and circuitry therefor.

Thus it can be seen that the invention accomplishes at least all of its stated objectives.

I claim:

1. In combination,
    an enclosed work area in which an asbestos abatement action is taking place,
    at least one air filtration unit having an intake end, a discharge end, and means for pulling air therethrough, the intake end of said air filtration unit being in operative communication with the interior of said work area for creating a negative air pressure within said work area,
    a multiple location negative air pressure monitor located remotely of said work area, said monitor comprising a housing means having a display panel means,
    a plurality of pressure differential sensing devices in said housing means,
    each of said sensing devices having low pressure and high pressure sides,
    an elongated tube operatively connected to and extending from the low pressure side of each of said sensing devices, the distal ends of said tubes being positioned in spaced-apart locations within said work area,
    an elongated tube operatively connected to and extending from the high pressure side of each of said sensing devices, the distal ends of said tubes being in communication with the atmosphere outside of said work area,
    and an indicator means operatively connected to said sensing devices for indicating the absence of the desired negative air pressure at one or more of the distal ends of the tubes positioned in said work area.

2. The combination of claim 1 wherein a plurality of digital displays are provided on said display panel means for displaying the air pressure at each of the distal ends of each of the tubes located in said work area.

3. The combination of claim 1 wherein said indicator means includes a visual signal means and an audible alarm means.

4. The combination of claim 1 wherein said digital displays are operatively connected to data recorders.

* * * * *